T. L. BURTON.
BRAKE BEAM SUPPORT.
APPLICATION FILED DEC. 4, 1918.
1,364,074.
Patented Jan. 4, 1921.
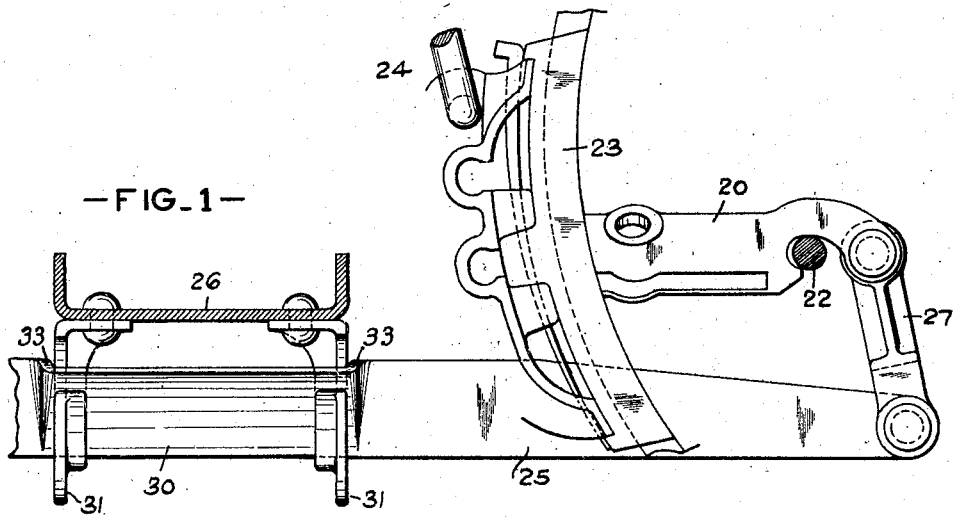
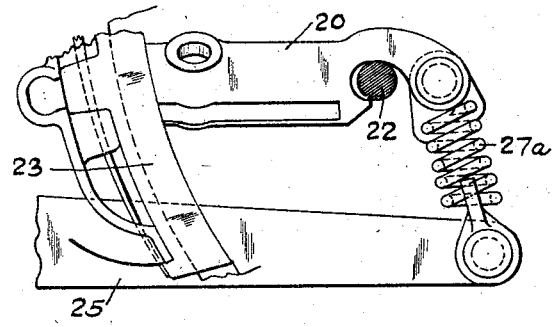
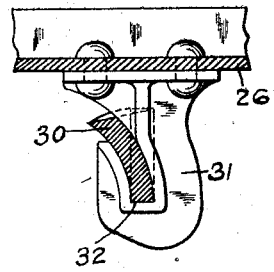
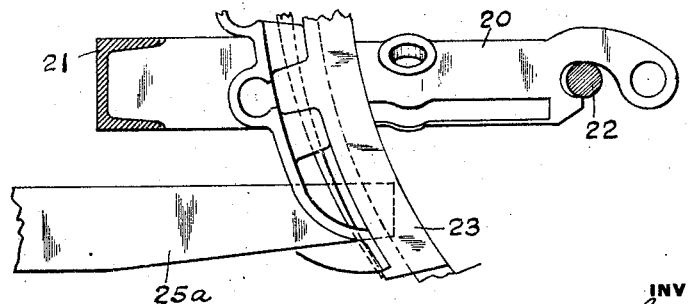
INVENTOR,
Thomas L. Burton.
by Edward A. Wright Att'y.

UNITED STATES PATENT OFFICE.

THOMAS L. BURTON, OF ST. LOUIS, MISSOURI.

BRAKE-BEAM SUPPORT.

1,364,074.   Specification of Letters Patent.   Patented Jan. 4, 1921.

Application filed December 4, 1918. Serial No. 265,214.

*To all whom it may concern:*

Be it known that I, THOMAS L. BURTON, a citizen of the United States, residing at St. Louis, in the State of Missouri, have invented certain new and useful Improvements in Brake-Beam Supports, of which improvement the following is a specification.

This invention relates to supports for brake beams and more particularly to a safety bar and the means for supporting the same upon the truck frame. These safety bars which extend beneath the brake beam for preventing the same from falling upon the track in case of emergency, and which may also be used for carrying a third point support for the brake beam, are usually attached to the spring plank of the truck frame, and the object of my present invention is to provide an improved hanger support whereby a single rigid or integral supporting bar may be readily applied bodily to the hanger by a lateral or transverse movement and be held thereon against longitudinal movement, without the use of bolts, clamps or other adjustable parts for locking the bar in position. For this purpose, my improvement comprises a suitable bracket or hanger having an open recess or socket formed therein and a rigid bar having a portion formed to be inserted and fit within said socket and prevent longitudinal movement of the bar therein.

In the accompanying drawing: Figure 1 is a side elevation of one form of a safety bar and support embodying my improvement; Fig. 2 a transverse section of the bar taken through the spring plank of the truck; Fig. 3, a side view showing a spring link as a third point support from the bar to the brake beam; and Fig. 4, a side view showing a short supporting bar serving as an emergency support only.

According to the form of my improvement illustrated in the drawing, there is attached to the spring plank 26 of the truck frame, one or more brackets or hangers 31, having formed therein recesses or sockets 32, open at the upper end. There are preferably two of such hangers, one at each side of the spring plank, for each safety bar, as indicated. The bar 25 is provided with an offset portion 30 formed to be inserted and fit within the recess or socket 32 of the hanger, the offset portion also forming shoulders 33, which engage the hangers and prevent longitudinal movement or displacement of the bar when placed in position. Any suitable form or shape may be given to the socket and bar whereby the bar may be applied bodily by a lateral or transverse movement to the hanger, it being inserted into the open end of the recess or socket and moved downward to its seat at the bottom of the same, the fit between the parts being such as to hold the bar snugly within the hanger and prevent the same from being displaced from its position. According to the preferred construction, the socket in the hanger is curved vertically upward and outward to its open end and the offset portion of the bar is formed upon a corresponding curve, as indicated in Figs. 1 and 2, the bar being adapted to be inserted laterally and in an inclined position into the opening and then turned to the vertical position as it slides down to its seat at the bottom of the curved socket. The bar is then held against longitudinal movement, and any vertical displacement or tilting of the bar is also prevented so that the same is securely held by gravity in its position without the use of any bolts, clamps or other adjustable or detachable parts which are always objectionable as they often become loose, broken and lost in the rough service to which this class of devices is subjected in the usual operation of railway cars.

The improved safety bar and support may be used with any form of brake beam, that shown in the drawing being of the ordinary trussed type having a main bar 21, a center strut 20, truss rod 22, brake shoes 23, and the usual hangers 24. As shown in Fig. 1, the safety bar 25, also carries the link 27, acting as a third point support for the brake beam. In Fig. 3, the link is shown in the form of a spring 27$^a$, which tends to hold the bar down upon the bottom of the socket in the hanger and prevent any tendency to rattle by a vertical vibration of the bar. The bar may also be used merely as an emergency support for the brake beam in case of the breakage of one of the usual hangers 24, and thereby prevent the brake beam from falling upon the track. In this case the bar is made shorter as indicated at 25$^a$, Fig. 4.

The construction of my improvement is very simple as a plain rigid rectangular bar may be readily offset at its middle portion and shaped to the desired curve to fit the curved sockets in the hook-shaped hangers, and all objectionable loose parts, such as bolts, or other clamping devices for locking the bar in position are entirely eliminated. The bar may also be readily applied or removed from the hangers at any time by a simple transverse or lateral movement and it is securely held in position during operation as it cannot be tilted vertically in case one of the brake beams should fall upon it, nor can it be displaced longitudinally in the hangers as the shoulders or projections engage the sides of the hangers and prevent such movement.

Having now described my invention what I claim as new and desire to secure by Letters Patent is:

1. A brake beam support, comprising a hanger attached to the truck frame and having a socket, and a safety bar extending beneath the truck frame and brake beam and having a portion formed to be inserted and fit within the socket and held therein against longitudinal movement.

2. A brake beam support, comprising a hanger attached to the truck frame and having a socket, and a safety bar extending beneath the brake beam and having an offset portion adapted to be inserted laterally into said socket and held therein against longitudinal movement.

3. A brake beam support, comprising a hanger attached to the truck frame and having an open socket, and a safety bar extending beneath the truck frame and brake beam and having a portion formed to be inserted laterally into the socket and held therein against longitudinal movement.

4. A brake beam support, comprising a hanger attached to the truck frame and having an open socket, and a safety bar extending beneath the brake beam and having an intermediate offset portion formed to be inserted laterally into said open socket and held therein against longitudinal movement.

5. A brake beam support, comprising a hanger attached to the truck frame and having an open socket, and a safety bar extending beneath the brake beam and having an offset portion formed on a curved section and adapted to be inserted laterally into said open socket and held therein against longitudinal movement.

6. A brake beam support, comprising a hanger having an open socket, and a safety bar extending beneath the brake beam and having an integral portion formed to fit said socket and provided with a shoulder for engaging the hanger to prevent longitudinal movement therein.

7. A brake beam support, comprising a hanger having an open curved socket, and a safety bar having an offset curved portion formed to fit said socket and adapted to be inserted therein by a lateral and partial rotary movement.

8. A brake beam support, comprising a hanger having an open socket, and a safety bar extending beneath the truck frame and brake beam and having a portion formed to be inserted laterally into and fit within said socket so as to prevent accidental vertical displacement of the bar in said hanger.

9. A brake beam support, comprising a pair of hangers attached to the spring plank of the truck, and each having an open socket, and a single integral safety bar extending beneath the brake beam and having a portion formed to fit within the sockets, said bar being adapted to be applied laterally to said hangers and provided with means for preventing longitudinal movement therein.

10. A brake beam support, comprising a hanger having a curved open socket, and a safety bar extending beneath the brake beam and having an integral curved offset portion formed to fit into said socket when applied laterally thereto and provided with means for preventing vertical and longitudinal displacement of the bar in the hanger.

In testimony whereof I have hereunto set my hand.

THOMAS L. BURTON.